US009935916B2

(12) United States Patent
Lindsey et al.

(10) Patent No.: US 9,935,916 B2
(45) Date of Patent: Apr. 3, 2018

(54) DYNAMICALLY MAPPING NETWORK ADDRESSES

(71) Applicant: Live View Technologies, Orem, UT (US)

(72) Inventors: Steven Richard Lindsey, Lehi, UT (US); Skyler J. Call, Lehi, UT (US); Charles G. Hayward, American Fork, UT (US)

(73) Assignee: LiveView Technologies, LLC, Orem, UT (US)

( * ) Notice: Subject to any disclaimer, the term of this patent is extended or adjusted under 35 U.S.C. 154(b) by 256 days.

(21) Appl. No.: 14/989,735

(22) Filed: Jan. 6, 2016

(65) Prior Publication Data

US 2017/0195280 A1 Jul. 6, 2017

(51) Int. Cl.
*G06F 15/16* (2006.01)
*H04L 29/12* (2006.01)

(52) U.S. Cl.
CPC ........ *H04L 61/103* (2013.01); *H04L 61/2514* (2013.01); *H04L 61/2567* (2013.01); *H04L 61/2517* (2013.01)

(58) Field of Classification Search
USPC ......... 709/213, 223; 715/735, 736; 717/162, 717/127
See application file for complete search history.

(56) References Cited

U.S. PATENT DOCUMENTS

| 8,792,563 | B2* | 7/2014 | Yova | H04N 7/14 375/240.26 |
|---|---|---|---|---|
| 2003/0034998 | A1* | 2/2003 | Kodosky | G05B 19/0426 715/736 |
| 2003/0037316 | A1* | 2/2003 | Kodosky | G06F 3/04817 717/127 |
| 2003/0037322 | A1* | 2/2003 | Kodosky | G06F 3/04817 717/162 |
| 2003/0095141 | A1* | 5/2003 | Shah | G06F 9/44505 715/735 |
| 2015/0120856 | A1* | 4/2015 | Bennett | H04L 47/10 709/213 |
| 2015/0120959 | A1* | 4/2015 | Bennett | H04L 47/10 709/233 |
| 2016/0173338 | A1* | 6/2016 | Wolting | H04L 41/145 709/223 |

\* cited by examiner

Primary Examiner — Tammy Nguyen
(74) Attorney, Agent, or Firm — Maschoff Brennan

(57) ABSTRACT

Exemplary embodiments include a system and method to systematically map complex network topologies for providing real-time network address and service port information for each network device in the system. Furthermore, various class objects also provide a real-time configuration capability of network devices, routers, modems, VPNs, and NATs in the system. Accordingly, system 100 can be managed with minimal user involvement while maintaining ongoing accuracy.

20 Claims, 6 Drawing Sheets

DYNAMICALLY MAPPING NETWORK ADDRESSES

TECHNICAL FIELD

This disclosure relates generally to dynamically mapping network addresses and, more specifically, to methods, devices, and systems for dynamically mapping network addresses in camera systems.

BACKGROUND OF RELATED ART

As the Internet grows and more network-enabled devices are connected to the Internet, it is becoming increasingly difficult to keep track of the network addresses as well as the various network topologies used by the network-enabled devices to connect to each other. With Network Address Translation (NAT), port forwarding, Virtual Private Networks (VPN), Dynamic Multipoint Virtual Private Networks (DMVPN), and Dispersive Virtualized Networks (DVN) using both Public and Private addressing schemes, there are many paths/hops that determine how to address a network-enabled device.

There is a need for technology that can not only keep track of the publicly accessible network addresses and service ports of network devices but also keep track of the complex network relationships of network topologies to automatically configure each network device, router, modem, VPN, and NAT accordingly. The technology should provide accurate information in real-time even when changes are made to the configuration.

BRIEF SUMMARY OF THE INVENTION

Exemplary embodiments include a system and method for receiving a device ID to identify a current object in a hierarchy of a plurality of objects. The hierarchy of the plurality of objects respectively corresponding to a hierarchy of a plurality of physical network devices and the plurality of objects having a common class including at least a parent network device ID property, a device type property, a WAN IP address property and a calculated public IP address property. A current object is designated as an origin object in the hierarchy and the device type property is analyzed and when the device type property is a modem with a public IP address, then returning a public IP address in the WAN IP address property as a calculated public IP address for the origin object having the device ID. Also, when the device type property is other than a modem with a pubic IP address, then assigning an object identified by the parent network device ID property as the current object and repeating analyzing.

DETAILED DESCRIPTION

Referring in general to the accompanying drawings, various embodiments of the present invention are illustrated to show the structure and methods for charting, managing and calculating network addresses for disparate devices across a multitude of network topologies in, for example, a video surveillance system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

As stated, as the Internet grows and more and more network-enabled devices are connected to the Internet, it is becoming increasingly difficult to keep track of the network addresses as well as the various network topologies used by network-enabled devices to connect to each other. With Network Address Translation (NAT), port forwarding, Virtual Private Networks (VPN), Dynamic Multipoint Virtual Private Networks (DMVPN), and Dispersive Virtualized Networks (DVN) using both Public and Private addressing schemes, there are many paths/hops that determine how to address a network-enabled device.

Figure 1:
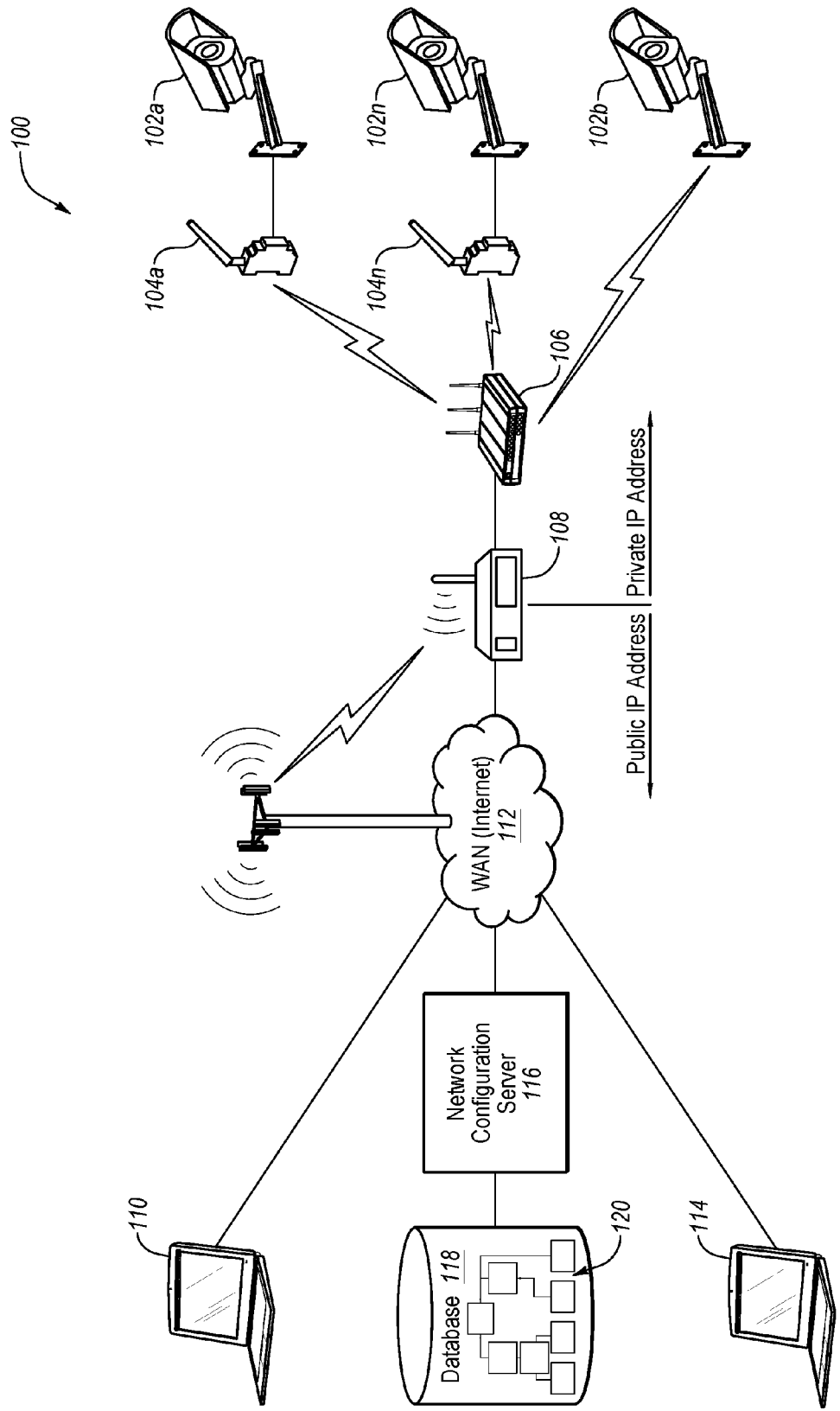
FIG. 1 depicts a camera system coupled through a wide area network including one or more cameras.

FIG. 1 illustrates a camera system coupled through a wide area network including one or more cameras for providing live video data to a user. System 100 includes one or more IP cameras 102 with each having a unique private IP address. Cameras 102 may each be connected to their own wireless bridges 104, where each wireless bridge 104 has a private IP address. Each wireless bridge 104 may be connected to a wireless Access Point (AP) 106 which has a private IP address. Wireless access point 106 may be further connected to a cellular modem 108 acting as a NAT router with both private and public IP addresses. Attempts by a user device 110 to connect via a Wide Area Network (WAN) (e.g., the Internet) 112 to an IP camera 102 must use the cellular modem's public IP address with the specific service port that is port-forwarded to the specific IP camera 102. Any attempts to connect to either the wireless bridge 104 or wireless access point 106 also requires connecting to the public address of the cellular modem 108 and the specific service port that is port forwarded to the wireless bridge 104 and wireless access point 106, respectively.

Complex mapping of network associations is performed by a network manager 114 accessing a network configuration server 116 which then stores object hierarchies 120 which respectively correspond to physical network device hierarches in database 118. The complex mapping further requires maintaining assigned network device addresses and service ports since the information is needed by various parts of the VPN, NAT, and for port-forwarding. By way of one example, network associations could be tracked by maintaining only the public addresses and service ports of each device in a linear table. According to a linear table approach, a user of a user device could identify the camera of interest, and lookup the associated public network address and service port. However, if the public IP address of the main NAT router (e.g., located in cellular/satellite modem 108) ever changes, and there are several network devices (e.g., wireless access point 106, wireless bridge 104, etc.) behind the NAT router (e.g., located in cellular/satellite modem 108), then the entries in the table affected by the IP address change would also need to be changed. As the number of devices increases, making changes to such simplistic network address resolution tables becomes more complicated and error prone.

Furthermore in a linear table approach, ongoing maintenance of each network device and its associated network topology becomes necessary. Similar network topologies also utilize keeping track of the specifics of each network topology in order to make changes or add and remove network devices without compromising the proper communication and overall operation of the system. Lastly, complex network topologies are often made up of disparate network devices, routers, modems, VPNs, and NATs which are made by different manufacturers with each running proprietary software. Therefore, configuration of each network topology may be labor intensive and require skilled talent to execute. Such requirements may be costly and time consuming.

System 100 configured with the various object classes, provides a method and structure to systematically map complex network topologies for providing real-time network address and service port information for each network device in the system. Furthermore, various class objects also provide a real-time configuration capability of network devices, routers, modems, VPNs, and NATs in the system. Accordingly, system 100 can be managed with minimal user involvement while maintaining ongoing accuracy.

System 100 implements a hierarchy including objects whose class types are indicative of the features and functions each network device performs. Each object class has a set of common attribute keywords or properties for a network address, service port, and parent node. Each network device in the network topology has an object in the hierarchy.

Figure 2:
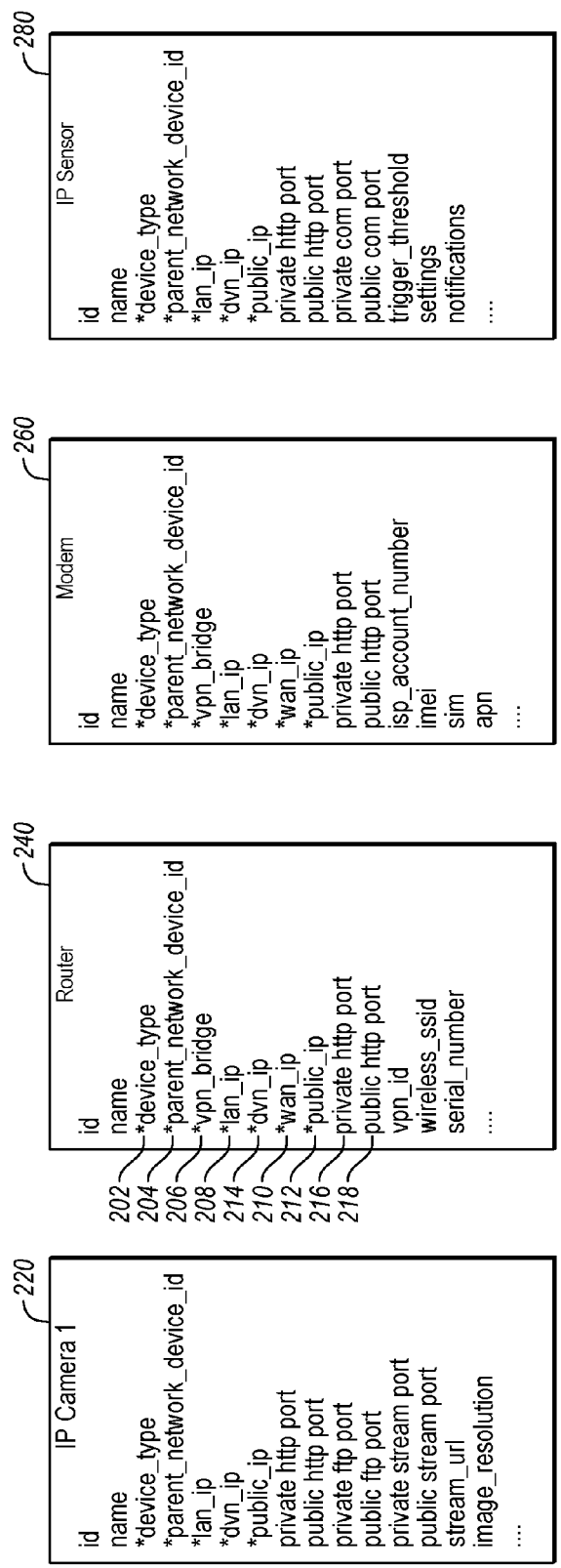
FIG. 2 illustrates object classes corresponding to various physical networking devices that may be configured within a cloud-based camera system.

FIG. 2 illustrates an example of an object class for an IP camera 220, an object class for a router 240, an object class for a modem 260, an object class for an IP sensor 280, etc. Common attribute keywords or properties may include, but are not limited to, "device_type" 202, "parent_network_device_id" 204, "vpn_bridge" 206, "lan_ip" 208, "wan_ip" 210, and others such as "public_ip" 212, "dvn_ip" 214, "private http port" 216 and "public http port" 218.

Furthermore, FIG. 2 illustrates object classes that may be configured within a cloud-based camera system 100, in accordance with an embodiment of the present disclosure. The objects based on the classes are configured to keep track of the public IP addresses and service ports of network devices and further keep track of the complex network relationships of network topologies in order to automatically configure each network device (e.g., router, modem, VPN, and NAT) accordingly. Configuring system 100 with the respective objects based on the disclosed object classes when organized in a hierarchy provides accurate information in real-time even when changes are made to the configuration.

By way of example in FIG. 2, the "device_type" 202 keyword or property defines the function of the device in the overall network topology and is used to determine hierarchy traversing paths by flagging the node as a child node, traversal node, or end node during real-time network address calculations. The "parent_network_device_id" 204 keyword or property defines the parent object that this object links to. As real-time network calculations are performed, objects are traversed along parent links. The "vpn_bridge" 206 keyword or property indicates that the router or modem object implements a VPN bridge that all sub devices behind it route through.

The "lan_ip" 208 keyword or property represents the primary address of the network device on the network it is physically connected to. This is often a private network but can be a public network. The "dvn_ip" 214 keyword or property represents the virtualized address of the network device that is mapped into a Dispersive Virtualized Networks (DVN). The "wan_ip" 210 keyword or property represents the secondary address of the network device if it is connected to an additional network. This is often associated with network devices that can perform routing, NAT, VPN, or port forwarding functions. Although this keyword typically represents a public network it can represent a secondary private network. The "public_ip" 212 keyword or property represents the calculated public network address that should be used to address the network device from the Internet. This keyword is computed and stored as a cached value to reduce computing time for frequent access requests for a particular network device's network address.

Ports are variable and custom to the network device's object class. However, each object class should have keyword references for both a private port number 216 and public port number 218 for relevant services the network device provides. Port numbers are combined with the appropriate network address when services are accessed or network configurations are set. Other keywords or properties defined in each class object are valid and used for the specific functions of the device.

The hierarchy of objects places network devices that perform services other than network routing, VPN, NAT, and port forwarding at the bottom as child nodes. These child node network devices are usually the starting point for calculations and hierarchy traversal and are placed at the bottom of the hierarchy. Next, the hierarchy places network devices that only perform network routing, VPN, NAT, and port-forwarding services in the middle as traversal nodes. Finally, the hierarchy places network devices that perform both bridging and network routing, VPN, NAT, and port forwarding services at the top of the hierarchy as end nodes. These end nodes are where real-time calculations must end and a public network address determined. Traversal calculations can start at any node level and a public network address can be resolved at any node level.

Figure 3:
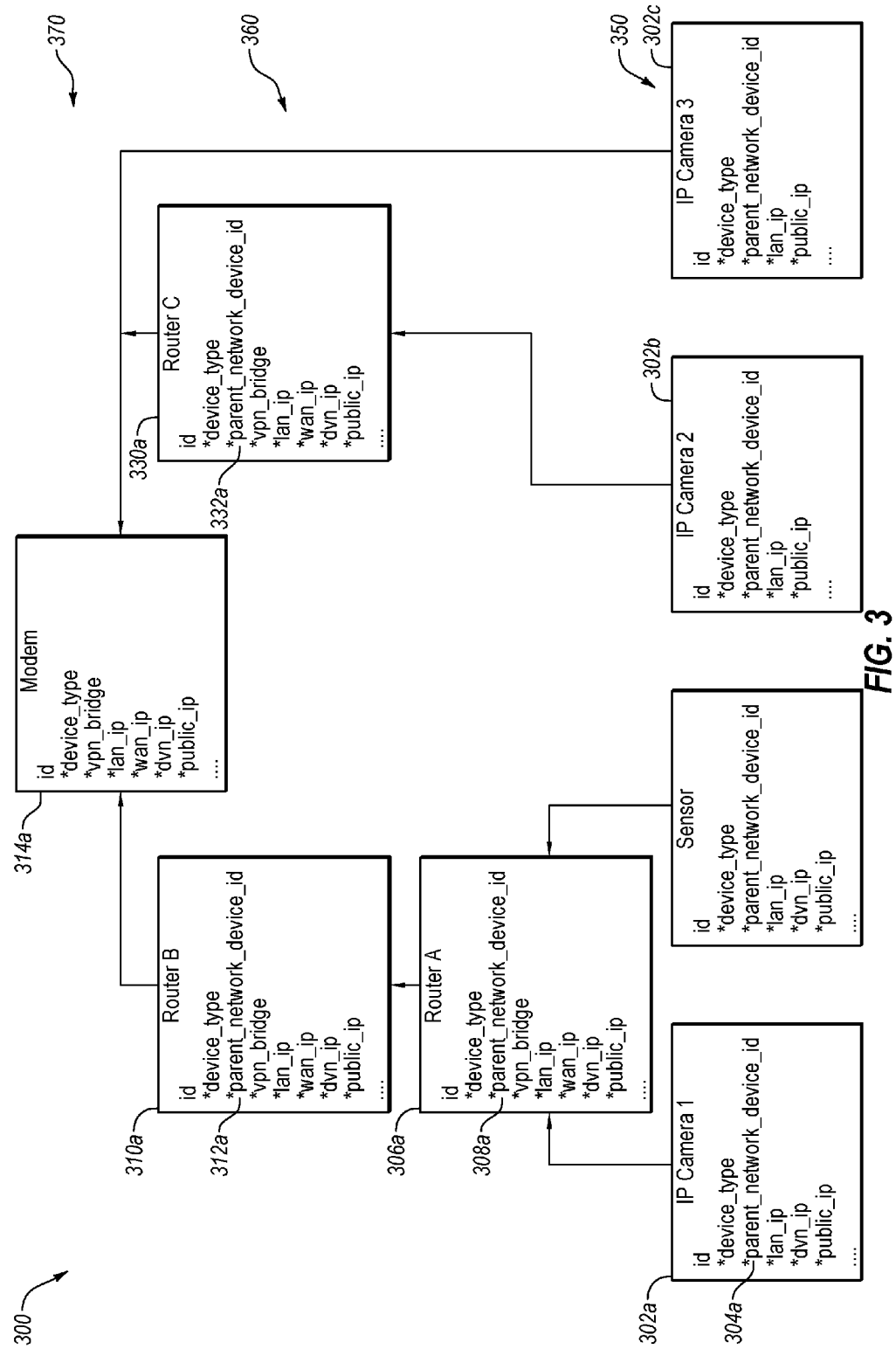
FIG. 3 illustrates a hierarchy of objects, according to an embodiment of the present disclosure.

FIG. 3 illustrates a hierarchy of objects 300 for systematically mapping complex network topologies providing real-time network address and service port information for each network device in the system. Hierarchy of objects 300 includes child nodes 350, traversal nodes 360, and end nodes 370. For example, to calculate the public network address for IP camera_1, corresponding for example to IP camera 102*a* in FIG. 1, traversal of the hierarchy of objects starts at IP Camera_1's node corresponding to object 302*a*. A determination is made to identify if the "parent_network_device_id" 304a of IP camera object 302a points to another node. In the example of FIG. 3, the "parent_network_device_id" property 304a points to Router A object 306a. A determination is then made to identify if the "parent_network_device_id" property 308a of Router A object 306a points to another node. In the example of FIG. 3, the "parent_network_device_id" property 308a points to a Router B object 310a.

A determination is then made to identify if the "parent_network_device_id" property 312a of Router B object 310a points to another node. In the example of FIG. 3, the "parent_network_device_id" property 312a points to modem object 314a. A determination is then made that identifies modem object 314a as an end node 370 (defined, for example, as a combined "bridge" and "router" device_type). Accordingly, identification of an end node 370 results in a determination that the end of the hierarchy of objects 300 has been reached. This determination results in a read of the "wan_ip" property which will contain the public networks address to use (with the service's public port property value) to ultimately connect to the IP camera 102a of FIG. 1. The resolved public network address can then be cached as the "public_ip" property of the IP Camera_1 node 302a for any future requests.

FIG. 3 further illustrates an alternate example for identifying addresses when a starting point is identified as a router. For example, in order to find the public network address of Router C object 330a, a determination is made to identify if the "parent_network_device_id" property 332a of Router C object 330a points to another node. In the example of FIG. 3, the "parent_network_device_id" property 332a points to Modem object 314a. A determination is then made that identifies modem object 314a as an end node 370 (defined as a combined "bridge" and "router" device_type). Accordingly, identification of an end node 370 results in a determination that the end of the hierarchy of objects 300 has been reached. This determination results in a read of the "wan_ip" property which will contain the public networks address to use (with the service's public port property value) to connect with Router C (for example wireless access point 106 of FIG. 1) and ultimately connect to the IP camera 102b shown in FIG. 1. The resolved public network address can then be cached as the "public_ip" property of the IP Camera_2 object 302b for any future requests.

Figure 4:
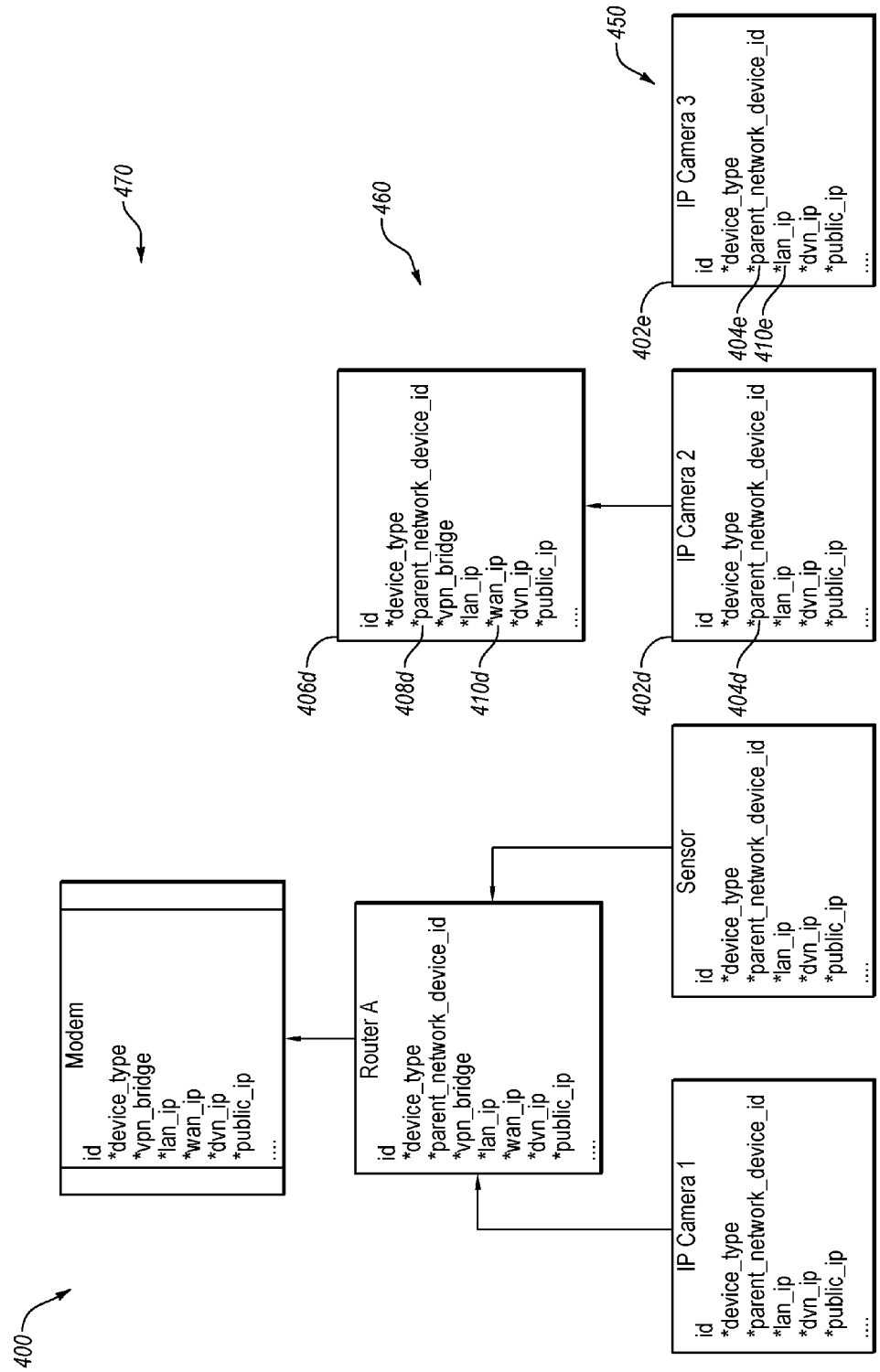
FIG. 4 illustrates another hierarchy of objects, according to an embodiment of the present disclosure.

FIG. 4 illustrates a hierarchy of objects 400 for systematically mapping complex network topologies providing real-time network address and service port information for each network device in the system. In the example of FIG. 4, a non-traditional network topology is illustrated where there may not always be an end node 470, traversal nodes 460, or child nodes 450.

Referring to FIG. 4, to calculate the public network address for IP camera_2 102, a determination is made to identify if the "parent_network_device_id" property 404d of IP Camera_2 object 402d points to another node. In the example of FIG. 4, the "parent_network_device_id" property 404d points to a Router B object 406d. A determination is then made to identify if the "parent_network_device_id" property 408d of Router B object 406d points to another node. In the example of FIG. 4, the "parent_network_device_id" 408d does not point to another node which indicates that the node that includes the public network address has been reached. Accordingly, the "wan_ip" property 410d contains the public network address used to connect to the IP camera 102.

In another example illustrated in FIG. 4, to calculate the public network address for IP camera_3 102, a determination is made to identify if the "parent_network_device_id" property 404e of IP Camera_3 object 402e points to another node. In the example of FIG. 4, the "parent_network_device_id" property 404e does not point to another node which indicates that the node that includes the public network address has been reached. Accordingly, the "lan_ip" property 410e contains the public network address used to connect to the IP camera 402e, since child nodes 450 contain a "lan_ip" property but not a "wan_ip" property.

By way of further examples, implementing a VPN addressing topology can be accomplished by asserting the "vpn_bridge" property as a flag on the node (i.e., within the object class) that implements the VPN bridge (a router or modem node "device_type"). During public network address calculations, if an asserted "vpn_bridge" property is encountered during node traversal, then all child nodes keep their "lan_ip" keyword or property network address as the public network address.

Implementing a DVN addressing topology can be accomplished by setting the "dvn_ip" property with the virtual address that is registered for the specific network device. During public network address calculations, if a node has a "dvn_ip" property set, then the traversal stops and the "dvn_ip" property network address is returned as the public network address.

There are various ways to start in the hierarchy and end in the hierarchy. The hierarchy is meant to mimic the literal implementation of hardware in the real network topology. Therefore, a public network address will be found for every node. One of the advantages of this method is realized when a network address anywhere in the hierarchy changes. All nodes that link to the node whose network address changed automatically inherit the change and will be successfully accessed with no additional changes needed. If a network topology change is made (i.e., a node is added, removed, or moved), the hierarchy will reflect the change and all public network addresses will be calculated correctly.

Because the hierarchy represents the literal implementation of hardware in the real network topology, the hierarchy can be used to configure routing, VPN, NAT, and port forwarding settings in the hardware devices. Furthermore, having the hierarchy represent the literal network topology allows for health monitoring of the entire network including the dependency links. For example, if a camera goes offline, it is now easy to use the hierarchy to determine where exactly the outage occurred. In the case of a VPN topology, the inherent health monitoring accounts for the network paths (public, private, and VPN) providing insight to any outages regardless of path.

Figure 5:
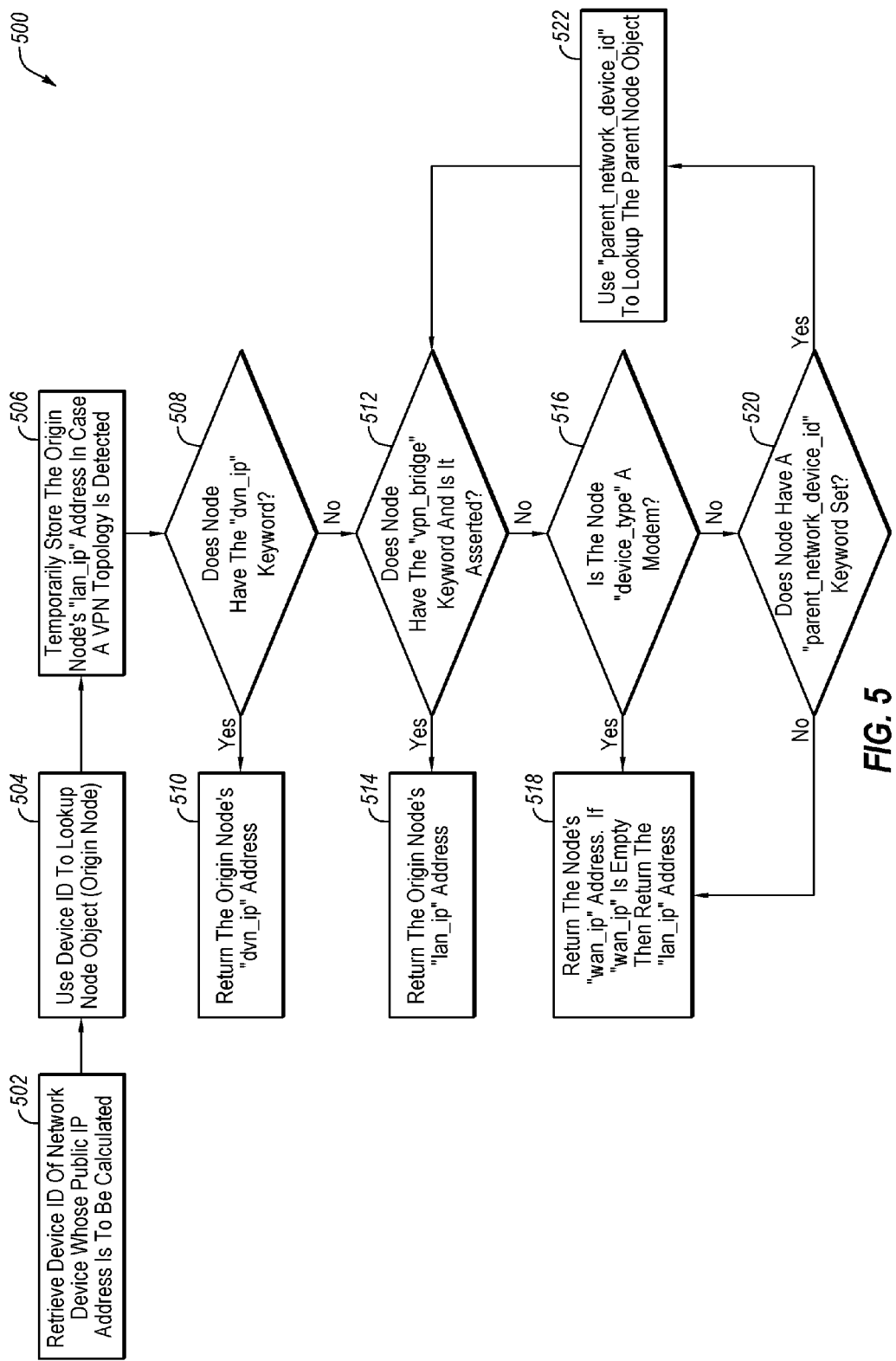
FIG. 5 is flowchart illustrating a method for determining an external network address, according to an embodiment of the present disclosure.

FIG. 5 is flowchart 500 illustrating a method, according to an embodiment of the present disclosure. Method 500, with reference to FIGS. 1-4, provides a method of charting, managing and calculating the network address of disparate devices across a multitude of network topologies. In a step 502, a system operating according to the method retrieves a device ID of a network device for calculation of the public IP address of the network device. The network device may correspond to one of devices 102, 104 or 106 in system 100 and the device ID is one of properties 202 in one of object classes 220, 240, 260 and 280.

In a step 504, the method looks-up a "node object" or "current node" (i.e., origin node) using the device ID 202. In a step 506, the method temporarily stores the lan_IP address of the origin's node in the event that the "vpn_bridge" property in the object class of the origin node is set to designate the node as a VPN.

In a step 508, the method determines if the corresponding object class of the current node includes a valid value in a "dvn_ip" property. If yes, then a step 510 in the method returns the current node's "dvn_ip" address. If no, then a step 512 determines if the current node has a "vpn_bridge" property and if that property is asserted. If the current node has an asserted "vpn-bridge" property, then a step 514 returns the origin node's "lan_ip" address. If the current node does not have an asserted "vpn-bridge" property, then a step 516 determines if the current node has a "device_type" that is a modem. If yes, then the current node's "wan_ip" address is returned, however, if the "wan_ip" property is empty, then the "lan_ip" address is alternatively returned.

If step 516 determines that the "device_type" is not a modem, then a step 520 determines if the current node has a "parent_network_device_id" property and is the property set. If the current node does not have a "parent_network_device_id" property set, then the step 518 returns the "wan-ip" address or if the "wan_ip" address is empty, then step 518 returns the "lan_ip" address. If step 520 determines the current node has a "parent_network_device_id" property that is set, then a step 522 uses the "parent_network_device_id" to lookup the parent node object and processing returns to step 512.

Figure 6:
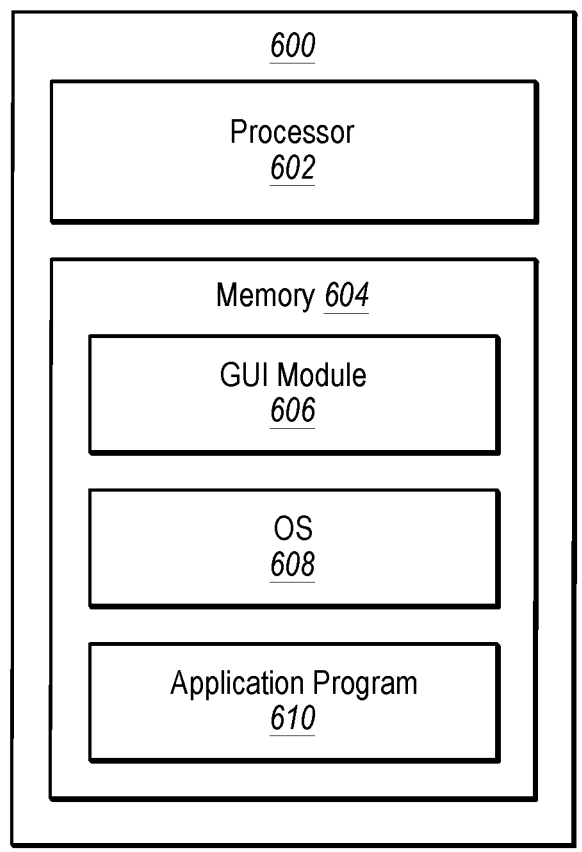
FIG. 6 illustrates a device that may be used to implement embodiments of the present disclosure.

FIG. 6 illustrates a device 600 that may be used to implement embodiments of the present disclosure. Device 600 may be configured as one or more of IP cameras 102, wireless bridges 104, access points 106, cellular modems 108, user device 110, network manager 114 and network configuration server 116. Device 600 may include a processor 602 and memory 604 for carrying out the various functions as steps of the systems disclosed herein. Device 600 may be operably coupled to a display which presents an interface to the user via a GUI 606. Device 600 may also operate under control of an operating system 608 stored in the memory 604, and interface with a user to accept inputs and commands and to present outputs through a GUI module 606 in conjunction with an application program 610. Device 600 may further include a database 612.

Further, operating system 608 and application program 610 may include instructions that, when read and executed by the processor 602, may cause the device 600 to perform the steps necessary to implement and/or use embodiments of the present invention. Application program 610 and/or operating instructions may also be tangibly embodied in memory 604 and/or data communications devices, thereby making a computer program product or article of manufacture according to an embodiment the invention. As such, the term "application program" as used herein is intended to encompass a computer program accessible from any computer readable device or media. Application program 604 may exist on IP cameras 102, wireless bridges 104, access points 106, cellular modems 108, user device 110, network manager 114 and network configuration server 116 of FIG. 1. Furthermore, application program 610 may exist on server and may be accessible to an end-user via an electronic device.

As will be appreciated by a person having ordinary skill in the art, embodiments of the present disclosure may implement a hierarchy including objects whose class types are indicative of the features and functions performed by each network device. Each object class has a set of common attribute keywords or properties for a network address, service port, and parent node. Each network device in the network topology has an object in the hierarchy. Because the hierarchy represents the literal implementation of hardware in the real network topology, the hierarchy can be used to configure all routing, VPN, NAT, and port forwarding settings in the hardware devices. Furthermore, having the hierarchy represent the literal network topology allows for health monitoring of the entire network including the dependency links. For example, if a camera goes offline, it is now easy to use the hierarchy to determine where exactly the outage occurred. In the case of a VPN topology, the inherent health monitoring accounts for the network paths (public, private, and VPN) providing insight to any outages regardless of path.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A method, comprising:
receiving a device ID to identify a current object in a hierarchy of a plurality of objects, the hierarchy of the plurality of objects respectively corresponding to a hierarchy of a plurality of physical network devices, the plurality of objects having a common class including at least a parent network device ID property, a device type property, a WAN IP address property and a calculated public IP address property;
designating the current object as an origin object in the hierarchy of the plurality of objects; and
analyzing the device type property of the current object and
when the device type property is a modem with a public IP address, then returning a public IP address in the WAN IP address property as a calculated public IP address for the origin object having the device ID; and
when the device type property is other than a modem with a pubic IP address, then assigning an object identified by the parent network device ID property as the current object and repeating analyzing.

2. The method of claim 1, the common class further including a LAN IP address property and a VPN bridge property, and when the VPN bridge property of the current object indicates true, then returning an IP address in the LAN IP address property as the calculated public IP address for the origin object.

3. The method of claim 1, the common class further including a DVN address property, and when the DVN address property of the current object includes an IP address, then returning the IP address in the DVN address property as the calculated public IP address for the origin object.

4. The method of claim 1, the common class further including a LAN IP address property, and when the WAN IP address property is empty, then returning an IP address in the LAN IP address property as the calculated public IP address for the origin object.

5. The method of claim 1, wherein the hierarchy of physical network devices includes at least one of an IP camera, a sensor, a router and a modem.

6. The method of claim 1, further comprising configuring a database to include the hierarchy of objects corresponding to a hierarchy of network devices configured to provide data from an IP camera to a user device.

7. An system, comprising:
a plurality of physical network devices;
a database configured to include a hierarchy of a plurality of objects, the hierarchy of the plurality of objects respectively corresponding to a hierarchy of a plurality of physical network devices, the plurality of objects having a common class including at least a parent network device ID property, a device type property, a WAN IP address property and a calculated public IP address property;
a network service configured to resolve a calculated public IP address of at least one of the plurality of physical network devices by:
receiving a device ID to identify a current object in a hierarchy of a plurality of objects, the hierarchy of the plurality of objects respectively corresponding to a hierarchy of a plurality of physical network devices, the plurality of objects having a common class including at least a parent network device ID property, a device type property, a WAN IP address property and a calculated public IP address property;
designating the current object as an origin object in the hierarchy of the plurality of objects; and
analyzing the device type property of the current object and
when the device type property is a modem with a public IP address, then returning a public IP address in the WAN IP address property as a calculated public IP address for the origin object having the device ID; and
when the device type property is other than a modem with a pubic IP address, then assigning an object identified by the parent network device ID property as the current object and repeating analyzing.

8. The system of claim 7, wherein the common class further including a LAN IP address property and a VPN bridge property, and when the VPN bridge property of the current object indicates true, then returning an IP address in the LAN IP address property as the calculated public IP address for the origin object.

9. The system of claim 7, wherein the common class further including a DVN address property, and when the DVN address property of the current object includes an IP address, then returning the IP address in the DVN address property as the calculated public IP address for the origin object.

10. The system of claim 7, wherein the common class further including a LAN IP address property, and when the WAN IP address property is empty, then returning an IP address in the LAN IP address property as the calculated public IP address for the origin object.

11. The system of claim 7, wherein the hierarchy of physical network devices includes at least one of an IP camera, a sensor, a router and a modem.

12. The system of claim 7, further comprising a database configured to include the hierarchy of objects corresponding to a hierarchy of network devices configured to provide data from an IP camera to a user device.

13. A system, comprising:
means for receiving a device ID to identify a current object in a hierarchy of a plurality of objects, the hierarchy of the plurality of objects respectively corresponding to a hierarchy of a plurality of physical network devices, the plurality of objects having a common class including at least a parent network device ID property, a device type property, a WAN IP address property and a calculated public IP address property;
means for designating the current object as an origin object in the hierarchy of the plurality of objects; and
means for analyzing the device type property of the current object and
when the device type property is a modem with a public IP address, then returning a public IP address in the WAN IP address property as a calculated public IP address for the origin object having the device ID; and
when the device type property is other than a modem with a pubic IP address, then assigning an object identified by the parent network device ID property as the current object and repeating analyzing.

14. The system of claim 13, the common class further including a LAN IP address property and a VPN bridge property, and when the VPN bridge property of the current object indicates true, then returning an IP address in the LAN IP address property as the calculated public IP address for the origin object.

15. The system of claim 13, the common class further including a DVN address property, and when the DVN address property of the current object includes an IP address, then returning the IP address in the DVN address property as the calculated public IP address for the origin object.

16. The system of claim 13, the common class further including a LAN IP address property, and when the WAN IP address property is empty, then returning an IP address in the LAN IP address property as the calculated public IP address for the origin object.

17. A non-transitory computer-readable storage medium storing instructions that when executed by a processor cause the processor to perform instructions, the instructions comprising:
receiving a device ID to identify a current object in a hierarchy of a plurality of objects, the hierarchy of the plurality of objects respectively corresponding to a hierarchy of a plurality of physical network devices, the plurality of objects having a common class including at least a parent network device ID property, a device type property, a WAN IP address property and a calculated public IP address property;
designating the current object as an origin object in the hierarchy of the plurality of objects; and
analyzing the device type property of the current object and
when the device type property is a modem with a public IP address, then returning a public IP address in the WAN IP address property as a calculated public IP address for the origin object having the device ID; and
when the device type property is other than a modem with a pubic IP address, then assigning an object identified by the parent network device ID property as the current object and repeating analyzing.

18. The non-transitory computer-readable storage medium of claim 17, the instructions further comprising the common class further including a LAN IP address property and a VPN bridge property, and when the VPN bridge property of the current object indicates true, then returning an IP address in the LAN IP address property as the calculated public IP address for the origin object.

19. The non-transitory computer-readable storage medium of claim 17, the instructions further comprising the common class further including a DVN address property, and when the DVN address property of the current object includes an IP address, then returning the IP address in the DVN address property as the calculated public IP address for the origin object.

20. The non-transitory computer-readable storage medium of claim 17, the instructions further comprising the common class further including a LAN IP address property, and when the WAN IP address property is empty, then returning an IP address in the LAN IP address property as the calculated public IP address for the origin object.

* * * * *